STANLEY S. KURPIT
IVO MAVROVIC
STANLEY J. SAFFIAN
INVENTORS

STANLEY S. KURPIT
IVO MAVROVIC
STANLEY J. SAFFIAN
INVENTOR.

BY J. T. Chaboty
AGENT

United States Patent Office 3,191,916
Patented June 29, 1965

3,191,916
APPARATUS FOR SEPARATING PURE AMMONIA
GAS FROM A MIXED OFF-GAS STREAM
Stanley S. Kurpit, Newark, N.J., and Ivo Mavrovic and
Stanley J. Saffian, New York, N.Y., assignors to Chemical Construction Corporation, New York, N.Y., a corporation of Delaware
Original application Feb. 4, 1960, Ser. No. 6,644, now
Patent No. 3,155,723, dated Nov. 3, 1964. Divided
and this application Jan. 15, 1964, Ser. No. 337,881
10 Claims. (Cl. 261—148)

This invention is a division of U.S. patent application Serial No. 6,644, filed February 4, 1960, now issued as U.S. Patent No. 3,155,723, and relates to improvements in the manufacture of urea from ammonia and carbon dioxide. A new apparatus for treatment of mixed off-gases has been developed, in which these mixed off-gases are completely recycled after partial condensation in an apparatus which separates a recycle ammonia stream free of carbon dioxide. Considerable improvement in heat and power economy is achieved in the present invention as compared to prior complete recycle urea processes, since dilution or the use of a carrier medium for ammonium carbamate recycle is avoided.

Urea is synthesized commercially by the reaction of ammonia with carbon dioxide at elevated pressure and temperature. In this process ammonium carbamate is formed as an intermediate compound, which upon loss of water yields urea. The reaction proceeds according to the following equations:

(1) $2NH_3 + CO_2 \rightarrow NH_2COONH_4$ (ammonium carbamate)
(2) $NH_2COONH_4 \rightarrow NH_2CONH_2$ (urea) $+ H_2O$

Equation 1 shows the formation of the intermediate compound ammonium carbamate. This is a rapid reaction under the usual process conditions, and readily goes to completion. However, Equation 2, the dehydration of ammonium carbamate to yield urea and water, is a comparatively slow reaction under the usual process conditions, and does not readily go to completion in practice. Thus the effluent from the high-pressure urea synthesis vessel contains a significant proportion of ammonium carbamate as well as urea product. The ammonium carbamate is readily separated from the liquid urea product by heating, which decomposes the ammonium carbamate by a reversal of Equation 1 and generates an off-gas containing ammonia and carbon dioxide. The subsequent processing of this off-gas is relatively difficult, since at lower temperatures and pressures the components ammonia and carbon dioxide readily recombine to form ammonium carbamate as a solid. Various procedures for disposal or recycle of the off-gas have been devised in the past.

One of the earliest commercial processes involved the complete recycle and recompression of the off-gas stream as a gas at elevated temperature. Various mechanical difficulties were encountered due to condensation of solid carbamate and accelerated corrosion. The basic power requirements were high, due to inherent low efficiency in compressing large volumes of hot gas to high pressure.

Other processes involve recycle of the gases after condensation in a liquid solution or slurry. An aqueous slurry process was one of the earliest commercial procedures, and the use of an inert mineral oil as a slurrying agent for solid carbamate recycle forms the basis of another more recent process. Another process of current interest recovers and absorbs the entire off-gas in a scrubbing solution comprising liquid ammonia, with the possible addition of water as a subsequent scrubbing agent. These procedures result in excessive dilution of the process stream hence output per unit of autoclave volume is reduced and larger pressure vessels must be provided. When excess water is added, the yield or percent of ammonium carbamate dehydration is also reduced.

Finally, a group of processes is known, which completely separate the components of the mixed off-gas stream, usually by selective absorption. Either ammonia or carbon dioxide is completely absorbed, independent of the other component. Subsequent regeneration of the absorbent solution liberates a pure gas stream which is then readily recycled to the process. The residual component which remains in the off-gas stream after absorption is also independently recycled to the process. High power and thermal requirements due to the necessity of an extra absorption-regeneration cycle are a major objection to this type of process.

Thus a broad range of technical solutions to the problem of off-gas recycle is available. However, it has been unexpectedly found that according to the present invention high yields of urea can be obtained in a full recycle process without disadvantages inherent in other types of process as described above. The apparatus which forms the subject of this invention provides a full utilization of ammonia and carbon dioxide in the synthesis and furthermore provides conservation of heat and power. Another significant advantage of the apparatus of the present invention is that water from an external source is not required to dissolve the recycling carbamate being returned to the synthesis step.

It is an object of this invention to provide an improved apparatus for separating pure ammonia gas from the mixed ammonia-carbon dioxide off-gas stream produced during urea synthesis.

Another object is to produce urea using a complete recycle apparatus which does not produce a mixed off-gas.

A further object is to provide an apparatus to process and recycle off-gas produced by ammonium carbamate decomposition in an improved and more efficient manner.

An additional object is to provide an apparatus for a recycle urea synthesis process which permits recycle of unconverted material without addition of water from an external source into the process stream.

These and other objects of this invention will become apparent from the description which follows.

In the apparatus according to this invention, the hot off-gas stream containing ammonia, carbon dioxide and water vapor is contacted with a cool recirculating aqueous ammonium carbamate solution containing excess ammonia. This contact is accomplished by scrubbing the gas stream in the lower packed section of a condenser-stripper vessel. The scrubbing step condenses the major portion of water vapor from the gas stream together with some ammonia, however, the most important effect of this step is that it strips most of the carbon dioxide content from the gas stream, thus leaving an ammonia-rich gas stream. The residual ammonia-rich gas stream is further scrubbed in additional packed and bubble-cap sections, leaving an ammonia exit gas free of carbon dioxide. This ammonia gas stream is separately condensed and recycled to the process in the ammonia feed section.

The initial scrubbing step cools the gas stream as well as condensing and stripping water, ammonia, and carbon dioxide. The scrubbing liquid, thus heated, is externally cooled in heat exchange means and recycled. A portion of this liquid is drawn off as a concentrated ammonium carbamate solution product, and is subsequently recycled to urea synthesis to join the main stream of ammonium carbamate formed by reacting incoming ammonia and carbon dioxide. The purified overhead ammonia gas stream is readily condensed to liquid ammonia without solids formation. Thus two liquid streams are recycled, with low heat losses and reduced power requirements. The only streams leaving the system are the product urea solution and the inerts discharged after the aforementioned ammonia condensation. Excessive dilution of process streams is avoided, since no additional external components are added to the process in the apparatus of the present invention.

Although this apparatus may be applied to any off-gas derived from carbamate decomposition, it is most suitable and provides greates improvements in process efficiency when combined with the urea synthesis process disclosed in co-pending U.S. patent application Serial No. 798,399 filed March 10, 1959, now abandoned and refiled February 11, 1960 as continuation-in-part application Serial No. 8,009 which issued as U.S. Patent No. 3,137,725, in which two stages of ammonium carbamate decomposition are involved. In this two-stage process, the off-gas from the first stage is contacted with and partially absorbed by an aqueous absorbent stream of ammonia-ammonium carbamate solution. This contact between the first stage off-gas and the liquid solution results in the generation of heat, and takes place while in heat exchange with the urea stream in the second stage of carbamate decomposition. The mixed gas-liquid stream resulting from this gas-liquid contact is scrubbed and the final gas phase is combined with the off-gas from the second stage of decomposition. The combined off-gas stream is then passed through the condenser-stripper, whereby an ammonia-rich gas stream free of carbon dioxide and a residual aqueous ammonia-ammonium carbamate solution are produced and recycled to the urea synthesis process.

In the accompanying drawings which illustrated the invention:

Figure 1:
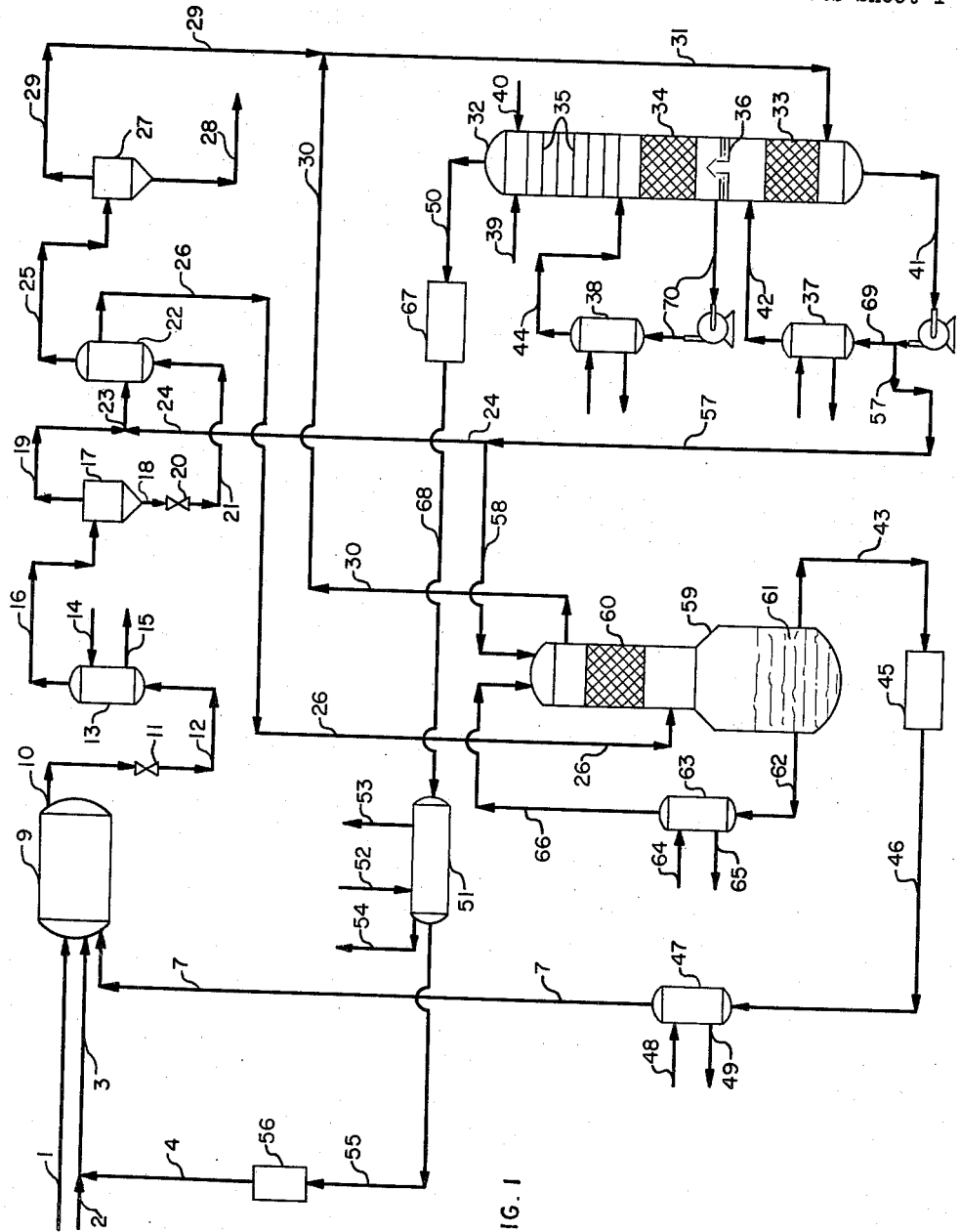
FIGURE 1 is a diagrammatical illustration of the invention.

A detailed description of the operation of the apparatus of the present invention follows. Referring to FIGURE 1, incoming carbon dioxide feed stream 1 and ammonia stream 3 are passed into high pressure urea synthesis reactor 9, with the total ammonia feed stream 3 consisting of incoming stream 2 combined with recycle ammonia stream 4. Recycle stream 7, consisting of a concentrated aqueous ammonia-ammonium carbamate solution, is also passed into reactor 9. Within reactor 9, ammonia and carbon dioxide combine to form ammonium carbamate, and a portion of the ammonium carbamate dehydrates to yield urea. The pressure and temperature ranges for urea synthesis within reactor 9 are well known, thus the pressure within reactor 9 will be between about 2000 to 6000 p.s.i.g. while the temperature will be in a range between about 320° F. to 430° F. Reactor 9 may be suitably disposed to provide either horizontal or vertical flow of reactants, and in fact reactor 9 may even consist of two vessels with premixing of ammonia and carbon dioxide as described in U.S. patent application No. 798,399 cited supra. The overall molar feed ratio of reactants is also a matter of selection and may vary from the stoichiometric 2 to 1 molar ratio of ammonia to carbon dioxide up to about 5 to 1 or even higher. In general, ratios higher than about 5 to 1 are considered not economical from a practical point of view, since it becomes necessary to provide a special vessel for the separation of the large quantity of excess ammonia present in the reactor effluent under such conditions prior to ammonium carbamate decomposition. Of course it should be understood that the process of the present invention is also readily applicable to such processes, as will appear from the following section of the process description.

The process stream now leaves reactor 9 via line 10. This stream will contain about 20% to 40% urea, with the balance consisting mainly of ammonium carbamate, ammonia and water. Specific proportions of these components will be a function of the aforementioned operating variables. The stream 10 is first passed through pressure reducing valve 11 where process stream pressure is reduced to a level of between about 200 p.s.i.g. to 400 p.s.i.g., prior to the first stage of ammonium carbamate decomposition. The specific pressure selected will depend on engineering considerations in a particular case. The stream now passes via line 12 to vessel 13, which is the first stage of a two-stage ammonium carbamate decomposition system. Vessel 13 is a steam-heated shell and tube heat exchanger, with steam entering the shell via 14 and condensate leaving via 15. The process stream 12 passes through the tubes of vessel 13, and due to the application of heat at the reduced pressure a major portion of the ammonium carbamate present decomposes into ammonia and carbon dioxide. The temperature of the process stream inside vessel 13 will depend on the particular operating pressure. Thus at 400 p.s.i.g, stream temperature will be from about 275° F. to 300° F., while at 200 p.s.i.g. the stream temperature will be maintained from about 240° F. to 265° F. Lower temperature is feasible at the lower pressure since ammonium carbamate is more readily decomposed at a lower pressure. The resulting process stream leaves via 16 and passes into decomposer separator 17.

Vessel 17 is a known type of gas-liquid separator, in which stream 16 is divided into a liquid stream 18 consisting of urea, water and residual ammonium carbamate, and a gas stream 19 containing excess ammonia plus ammonia and carbon dioxide derived from the first stage of carbamate decomposition. The impure liquid product stream 18 is passed through pressure reducing valve 20, whereby stream pressure is further reduced to a suitable level for final and complete ammonium carbamate decomposition. A pressure level in the range between 5 p.s.i.g. to 50 p.i.s.g. is suitable for this second and final stage of decomposition.

The product stream, now at a suitable reduced pressure passes via 21 into the second stage ammonium carbamate decomposer vessel 22. Vessel 22 is similar in design and function to vessel 13 previously described. Heat is provided for the shell side of vessel 22 by contacting off-gas stream 19 with an aqueous ammonia-ammonium carbamate solution 24 obtained from a later stage of the process. Streams 19 and 24 are passed via 23 into the shell side of vessel 22 at a temperature between about 250° F. to 350° F., and subsequently leave vessel 22 via line 26 as a mixed gas-liquid stream. Gas absorption and reaction takes place when streams 19 and 24 are combined. This liberates heat which accomplishes the final decomposition of residual ammonium carbamate present in stream 21 at a stream temperature between about 150° F. to 230° F. As previously discussed in connection with the first stage of decomposition, operating temperature is primarily a function of pressure. The urea product stream now leaves vessel 22 via 25, and passes into vessel 27 which is a liquid-gas separator of design and function similar to unit 17 previously described. The product urea solution, containing minute quantities of ammonia and carbon dioxide, is passed to urea finishing operations via 28.

A final off-gas stream, derived from the second stage decomposition and containing ammonia, carbon dioxide and water vapor, is removed via 29 and is combined with the residual off-gas stream 30. Stream 30 is indirectly derived from the heat exchange step in the second stage of ammonium carbamate decomposition by the scrubbing of stream 26 in vessel 59 in a manner to be subsequently described. The combined off-gas stream 31 is recovered at a pressure and temperature which correspond closely to conditions in the second stage of carbamate decomposition, with gas composition consisting primarily of ammonia, carbon dioxide and water vapor in proportions dependent upon operating variables. Usually the gas will contain about 40% ammonia, 25% carbon dioxide and 30% water vapor.

Gas stream 31 is passed into condenser-stripper vessel 32 below the lower packed section 33. Vessel 32 will usually contain a second upper packed section 34 for accurate temperature control. A bubble-cap section 35 is provided in the upper section of vessel 32, for final purification of the rising gas stream. The entering gas stream 31 passes upwards through packed sections 33 and 34 and bubble cap section 35. In each section the gas is scrubbed with an aqueous ammonia-ammonium carbamate solution, whereby carbon dioxide is removed from the gas. In section 33 the scrubbing also cools the gas stream, preferably to a temperature between about 125° F. to 140° F. This cooling serves to condense water vapor and some ammonia, and to remove most of the carbon dioxide from the gas stream. The lower the temperature to which the gas stream is cooled, the more water vapor and carbon dioxide will be removed. Thus above 140° F. an insufficient amount of carbon dioxide is removed from the gas stream, while below 125° F. the scrubbing solution may deposit solid carbamate.

The warmed aqueous solution collected at the bottom of vessel 32 at a temperature between about 130° F. to 145° F. consists essentially of a concentrated ammonium carbamate solution in equilibrium with excess ammonia, and contains about 32% ammonia, 32% carbon dioxide and 36% water. This solution is removed via line 41 and partially recycled via 69 with the balance passing to other parts of the process via 57. The solution in line 69 is first cooled in cooler 37 to a temperature between about 125° F. and 140° F., and is then recycled via 42 to vessel 32 above packed section 33. As previously described, its primary function is to cool and scrub the gas stream in packed section 33, thereby simultaneously condensing and removing carbon dioxide, together with water vapor and some ammonia.

The remaining gas stream now passes upwards through separator 36 and enters packed section 34. Separator 36 serves to recover down-flowing liquid solution from 34, while allowing upward gas flow. Packed section 34 has a function and operation similar to packed section 33 previously described. The gas stream enters the bottom of section 34 with a carbon dioxide content of about 5%, and consists mostly of ammonia. The scrubbing solution in section 34 is a dilute ammonium carbamate solution containing excess ammonia, and is withdrawn via line 70 at a temperature below 120° F., cooled in cooler 38 to about 115° F., and then recycled via 44 to vessel 32, about section 34. Thus section 34 differs from section 33 in having a lower temperature level and a weaker scrubbing solution. The carbon dioxide content of the gas stream is lowered from about 5% to about 0.3% to 0.5% by the scrubbing step in section 34.

The gas stream now passes upwards through bubble cap sections 35. A temperature gradient is maintained in section 35, with the top plate being cooled to a liquid phase temperature of about 50° F. or less, either by cooling coils or by flashing in a slight amount of ammonia via 39. Thus the liquid phase on the top tray is a strong cold ammonia solution containing about 55% ammonia, with only a very minor carbon dioxide content, while the liquid phase on the bottom tray is warm and lower in free ammonia, but contains about 10% to 20% ammonium carbamate. The gas stream is thus essentially freed of carbon dioxide content in section 35, and leaves unit 32 via line 50 at a temperature between about 50° F. to 75° F. as ammonia gas with less than 100 p.p.m. carbon dioxide, together with about 1% by weight of water vapor. Inert gases are also removed from the system in gas stream 50. An equivalent small water makeup stream 40 serves to maintain the water balance on the system, since the water removed via line 50 is subsequently eliminated from the process during compression. The maximum allowable gas temperature at the top of section 35 is primarily a function of pressure. Thus if unit 32 is operated at 15 p.s.i.g, the outlet gas temperature must be maintained below 80° F. to insure complete removal of carbon dioxide. At 50 p.s.i.g., the maximum allowable temperature is 85° F. In any case, the gas must be cooled to below 100° F. with lower temperature being required at lower pressures.

The recovered ammonia stream 50 is partially compressed in recovered ammonia compressor 67 and is then passed via 68 into cooler-condenser 51, which is cooled by coolant admitted via 52 and removed via 53. Essentially all of the ammonia is condensed to liquid which leaves via 55. A purge stream 54 containing inerts is refrigerated for ammonia recovery, not shown, and is discharged to a stack. The liquid ammonia stream 55 is brought to urea synthesis pressure in pump 56 and returned to urea synthesis via 4.

Returning to vessel 32, as a result of the aforementioned processing there is a net recovery of liquid solution as well as the pure overhead ammonia gas stream 50. Thus the liquid solution 41 is divided into two portions. The recycle stream 69, derived from 41, is returned to unit 32 as previously described. The balance of stream 41 is recycled via 57 to the urea synthesis process. Thus the overall operation of vessel 32 divides the incoming stream 31 into two portions, pure ammonia stream 50 and stream 57 containing about 32% ammonia, 32% carbon dioxide and 36% water.

Referring now to vessel 22, the second stage of ammonium carbamate decomposition, shell side input stream 24 is derived from stream 57. The reaction of streams 24 and 19, admitted via 23, in addition to producing heat in the shell side of 22 also results in the formation of a mixed gas-liquid stream 26. Stream 26 is passed into gas scrubber-absorber 59. Unit 59 is a packed gas-liquid scrubber provided with a packed section 60 and a liquid reservoir section 61, and operated at a pressure level essentially equal to that of the first stage of ammonium carbamate decomposition. The gaseous component of stream 26 is scrubbed in section 60 while the liquid component joins solution 61, which consists of a concentrated aqueous ammonia-ammonium carbamate solution. Scrubbing of the gas in 60 removes most of the ammonia and carbon dioxide present in the gas, and the residual off-gas containing inerts is removed via 30 and joins stream 29 to form combined off-gas stream 31 which is processed as previously described.

A portion of the liquid solution 61 is recycled to the top of vessel 59 as a scrubbing agent. This portion is removed via 62, cooled in cooler 63 which is cooled by cooling water admitted via 64 and removed via 65, and finally admitted to the top of vessel 59 via 66. An additional source of scrubbing liquid for vessel 59 is stream 58, which is derived from stream 57 previously described. The level of liquid solution 61 within vessel 59 is maintained by removing a portion of rich scrubbing liquid via 43. Stream 43 is recycled to urea synthesis via high-pressure liquid pump 45. The liquid stream thus leaves 46 at urea synthesis pressure, and passes through heater 47 which is heated by steam admitted via 48 with condensate removal via 49. The liquid stream, now at urea synthesis conditions, is recycled via 7 to the urea synthesis reactor 9.

Figure 2:
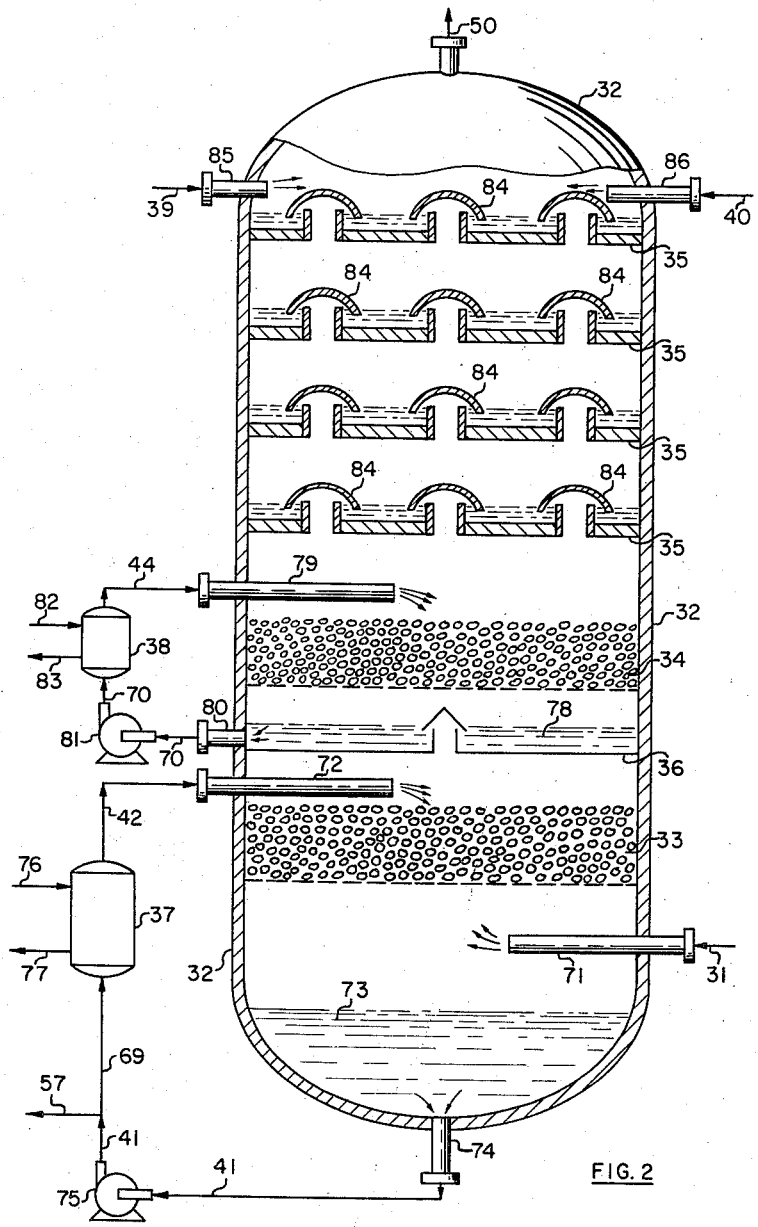
FIGURE 2 is a side elevational view, partly in section showing the condenser-stripper vessel in detail.

FIGURE 2 provides a detailed illustration of the apparatus of the present invention. Thus, referring to FIGURE 2, the mixed off-gas stream 31 is passed via pipe 71 through an opening in vessel 32 below packed section 33 which consists of a bed of packing material. The gas stream 31 thus rises upwards through packed section 33, countercurrent to aqueous liquid ammonia-ammonium carbamate solution stream 42 which is dispersed above packed section 33 by pipe 72 and flows downwards through section 33. Stream 42 thus scrubs and cools the gas phase in section 33, with concomitant absorption of a portion of the carbon dioxide from the gas phase into the liquid phase as dissolved ammonium carbamate. The warmed liquid solution collects in the bottom of vessel 32 as pool 73, and is withdrawn via pipe 74 through an opening in the bottom of vessel 32 as stream 41. The warmed liquid stream 41 passes through circulating pump 75, and then is divided into process stream 57 which is utilized as described supra, and recycle stream 69. Stream 69 is cooled in cooler 37, which is a heat exchanger provided with cooling fluid inlet stream 76 and outlet stream 77. The resulting suitably cooled solution stream 42 is then cycled via pipe 72.

The rising cooled gas phase now passes upwards from packed section 33 and through separator 36, which serves to recover downflowing aqueous ammonia-ammonium carbamate solution from packed section 34 as pool 78, while allowing upward gas flow. The rising gas phase thus passes upwards from separator 36 and through section 34, which is similar in operation and function to section 33 described supra. Thus, cold aqueous ammonia-ammonium carbamate scrub solution 44 is dispersed onto packed section 34 via pipe 79, which extends through an opening in vessel 32. Stream 44 flows downward through section 34 countercurrent to the rising gas phase, thus serving to scrub the gas phase and condense carbon dioxide into the liquid phase as dissolved ammonia carbamate. The resulting warmed liquid phase pool 78 is withdrawn via pipe 80 from an opening in vessel 32 as stream 70, which is now passed through circulating pump 81 and thence through cooler 38, which is a heat exchanger provided with cooling fluid inlet stream 82 and warmed fluid outlet stream 83. The cooled aqueous ammonia-ammonium carbamate solution stream 44 is then recycled via pipe 79.

This rising gas phase from section 34, now with only a small residual carbon dioxide content as described supra, next passes through bubble cap plates section 35. The bubble caps are disposed on plates 35 as individual bubble cap units 84. Intimate contact between the rising gas phase and the liquid solution on each plate 35 is thus attained, as the gas phase passes through bubble caps 84. The liquid on plates 35 flows generally downwards in a conventional manner, either through bubble caps 84 or through separate liquid downcomer pipes, not shown, which may be provided in a conventional manner known to the art, extending vertically between two adjacent parallel plates 35 so as to conduct liquid solution downwards from one plate 35 to the next lower plate 35. As described in detail supra, a temperature gradient is maintained between plates 35, such that the topmost plate is at the lowest temperature level, by flashing in a small amount of liquid ammonia stream 39, which passes via pipe 85 into the upper section of vessel 32 and flashes to vapor, thus providing a cooling effect. Additional liquid ammonia inlet pipes, not shown, may also be disposed at lower points in the bubble caps section between the individual plates 35, thus providing auxiliary cooling between the plates as desired. Makeup water stream 40 is passed into the upper section of vessel 32 via pipe 86, which extends through an opening in vessel 32 and disperses water stream 40 onto the uppermost bubble cap plates 35. As described supra, suitable cooling coils may be provided on plates 35 for cooling of the liquid phase, instead of attaining cooling by flashing of liquid ammonia stream 39. Product pure ammonia gas stream 50 substantially free of carbon dioxide is removed from the top of vessel 32 via outlet pipe 87, which extends from an opening in vessel 32. Stream 50 is processed and recycled to urea synthesis as described supra.

The apparatus combination embodied in vessel 32 thus separates the mixed off-gas stream 31, containing ammonia, carbon dioxide and water vapor, into aqueous ammonia-ammonium carbamate solution stream 57 and pure ammonia gas stream 50.

A preferred embodiment of the invention as applied in an industrial installation will now be described. In the following description, all flows are lbs./hr. unless otherwise specified.

The urea synthesis reactor was operated at 3500 p.s.i.g and about 365° F., and received process flow streams consisting of 3100 ammonia, 3130 carbon dioxide, and a recycle solution from the scrubber-absorber containing 3220 carbon dioxide, 4500 ammonia and 1600 water. Thus a total molar feed ratio of 3.1 mols ammonia to 1 mol carbon dioxide was employed. The reactor effluent was recovered at 365° F., and contained 4160 urea, 2850 water, 5850 carbamate and 2690 ammonia.

The process stream pressure was reduced to 300 p.s.i.g, and the stream passed through the first stage of ammonium carbamate decomposition at a temperature of 266° F. After separation, the off-gas contained 3740 ammonia, 2110 carbon dioxide and 360 water vapor, while the liquid stream contained 4160 urea, 2490 water, 1510 ammonia and 1190 carbon dioxide. Part of the ammonia and carbon dioxide in the liquid stream were combined as ammonium carbamate. The liquid stream was passed through the second stage of carbamate decomposition at a temperature of 212° F. and pressure of 15 p.s.i.g. After separation, the off-gas from the second stage contained 1410 ammonia, 1110 carbon dioxide and 1240 water vapor, while the product urea solution contained 4160 urea, 1250 water and minute quantities of ammonia and carbon dioxide.

The off-gas from the first stage decomposer was reacted in the shell of the second stage decomposer with a recycled absorbent solution from the condenser-stripper, thereby developing a temperature of 260° F. at 230 p.s.i.g. The absorbent solution contained about 32% ammonia, 32% carbon dioxide and 36% water. The resulting mixed gas-liquid solution was passed into the gas scrubber-absorber, and the residual unabsorbed gas from this scrubber was combined with the off-gas from the second stage decomposition to give a final off-gas containing, by weight percent, 42% ammonia, 27% carbon dioxide and 30% water vapor. Actual total flow rate was 4133 lbs./hr. This combined off-gas stream was at 212° F. and 15 p.s.i.g., and was passed into the condenser stripper below the lower packed section. The residual gas stream above this section was at a temperature of 135° F., and contained 5% carbon dioxide, 2.5% water vapor, with the balance ammonia and inerts. This gas stream was further cooled and scrubbed in the upper packed section at a temperature of about 115° F., as a result of which the carbon dioxide content of the gas was further lowered from about 5% to 0.3%.

The remaining gas stream, now consisting almost completely of ammonia, was freed to residual carbon dioxide by passing upwards through the bubble cap sections. The liquid phase on the bottom tray was relatively warm, with an equilibrium temperature of about 100° F. This solution contained 10% ammonium carbamate. Each succeeding tray in an upwards direction was colder than the previous one, with the top tray solution at a temperature of 70° F. The solution on this tray contained about 55% ammonia and less than 1% ammonium carbamate. The solution was cooled and maintained at 70° F. by ammonia injection. The equilibrium product gas stream above the top tray was at 75° F. and contained only 50 p.p.m. of carbon dioxide. This gas stream, essentially pure ammonia, was compressed and liquefied by cooling to remove inerts, and finally recycled to urea synthesis feed. Recycle feed rate was 643 lbs./hr. of ammonia.

A portion of the absorbent solution derived from the bottom of the condenser-stripper was recycled to the top of the lower packed section, while most of the balance was admitted to the absorber-scrubber and utilized as a gas scrubbing medium. A small stream of this solution was contacted with the first stage off-gas as previous described. Total net solution withdrawn from the condenser-stripper unit contained 1110 carbon dioxide, 1110 ammonia and 1250 water. A portion of the rich solution withdrawn from the bottom of the absorber-scrubber was recycled to urea synthesis as previously described, while another portion was cooled and recirculated to the top of the unit thus maintaining a scrubbing temperature of about 140° F., with an operating pressure of 250 p.s.i.g.

The above discussion of a preferred embodiment of this invention is intended primarily for descriptive purposes, and should not be interpreted to limit or restrict the invention.

Various modifications and alterations in the heat transfer and heat recovery systems, as well as known processing modifications found in the prior art, may be readily applied and utilized in conjunction with this invention.

We claim:

1. An apparatus for separating a mixed off-gas stream derived from a urea synthesis process and containing ammonia, carbon dioxide and water vapor into pure ammonia gas and aqueous ammonium carbamate solution which comprises, in combination, a vertically oriented separator vessel, at least one bed of packing for gas-liquid contact, said bed being horizontally disposed in the lower portion of said vessel as a lower bed, at least one bubble-cap plate for gas scrubbing, said plate being horizontally disposed within said vessel and above said lower bed, means below said lower bed to pass said mixed off-gas stream into said vessel, whereby said mixed off-gas stream flows vertically upwards through said bed, a pump for circulating liquid external to said vessel, means to pass warmed aqueous ammonium carbamate solution from below said bed in said vessel to said pump, means to separate the solution discharged from said pump into a stream of product aqueous ammonium carbamate solution and a stream of recycle solution, a first cooling means, means to pass said recycle solution through said first cooling means whereby said solution is cooled, means to pass the resulting cooled solution into said vessel above said bed whereby said cooled solution is dispersed into said bed and flows vertically downwards through said bed, a second cooling means, said second cooling means being disposed on said plate within said vessel, whereby the liquid phase on said plate is cooled, and means above said plate for removal of substantially pure ammonia gas from said vessel.

2. Apparatus of claim 1, in which said second cooling means disposed on said plate comprising means for flashing ammonia coolant into the liquid solution on said plate.

3. Apparatus of claim 1, in which means are provided above said plate to pass water onto said plate.

4. Apparatus of claim 1, in which an upper bed of packing is horizontally disposed within said vessel between said lower bed and said plate, together with a horizontal separator partition within said vessel between said lower bed and said upper bed, whereby the rising gas phase passes upwards through said partition into said upper bed and downflowing warmed ammonium carbamate solution from said upper bed is retained on said partition, an auxiliary pump for circulating liquid external to said vessel, means to pass warmed solution retained on said partition from within said vessel to said auxiliary pump, a third cooling means, means to pass said retained solution through said third cooling means whereby said solution is cooled, and means to pass said cooled retained solution into said vessel above said upper bed whereby said solution is dispersed into said upper bed and flows vertically downwards through said bed.

5. Apparatus of claim 1, in which a plurality of parallel horizontal bubble-cap plates is provided within said vessel, together with said second cooling means disposed on at least one of said plates within said vessel, whereby the liquid phase on said plate is cooled, said means above said plate for removal of substantially pure ammonia gas from said vessel being above the uppermost of said plates.

6. Apparatus of claim 5, in which said second cooling means is disposed on the uppermost of said plates.

7. Apparatus of claim 5, in which means are provided above the uppermost of said plates to pass water onto said plate.

8. An apparatus for separating a mixed off-gas stream derived from a urea synthesis process and containing ammonia, carbon dioxide and water vapor into pure ammonia gas and aqueous ammonium carbamate solution which comprises, in combination, a vertically oriented separator vessel, a bed of packing for gas-liquid contact, said bed being horizontally disposed in the lower portion of said vessel, means below said bed to pass said mixed off-gas stream into said vessel, whereby said mixed off-gas stream flows vertically upwards through said bed, a pump for circulating liquid external to said vessel, means to pass warmed aqueous ammonium carbamate solution from below said bed in said vessel to said pump, means to separate the solution discharged from said pump into a stream of product aqueous ammonium carbamate solution and a stream of recycle solution, a first cooling means, means to pass said recycle solution through said first cooling means whereby said solution is cooled, means to pass the resulting cooled solution into said vessel above said bed whereby said cooled solution is dispersed into said bed and flows vertically downwards through said bed, a plurality of parallel horizontal bubble-cap plates, said plates being disposed within said vessel above said bed, a second cooling means, said second cooling means being disposed on at least one of said plates within said vessel whereby the liquid phase on said plate is cooled, and means above said plate for removal of substantially pure ammonia gas from said vessel.

9. Apparatus of claim 8, in which said second cooling means comprises means for flashing ammonia coolant into the liquid solution on said plate.

10. Apparatus of claim 8, in which means are provided above the uppermost of said plates to pass water onto said plate.

References Cited by the Examiner

UNITED STATES PATENTS

| 1,328,259 | 1/20 | Barbet | 261—148 X |
| 2,701,262 | 2/55 | Cook | 260—555 |
| 2,716,024 | 8/55 | Dice | 261—147 |
| 2,777,877 | 1/57 | Fauser | 260—555 |
| 2,838,135 | 6/58 | Pilo et al. | 261—147 X |
| 2,995,499 | 8/61 | Dukler et al. | 202—158 X |

FOREIGN PATENTS 1,076,312  4/54  France.

HARRY B. THORNTON, *Primary Examiner.*

RONALD R. WEAVER, *Examiner.*